(12) United States Patent
Lavigne

(10) Patent No.: US 7,103,005 B2
(45) Date of Patent: Sep. 5, 2006

(54) SYSTEM AND METHOD FOR RESOLVING WRAPAROUND AMBIGUITY IN A COUNTER

(75) Inventor: Bruce E. Lavigne, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1009 days.

(21) Appl. No.: 10/091,875

(22) Filed: Mar. 5, 2002

(65) Prior Publication Data

US 2003/0169754 A1    Sep. 11, 2003

(51) Int. Cl.
 *G01R 31/08* (2006.01)
 *G06F 11/00* (2006.01)
(52) U.S. Cl. ....................... 370/252; 370/235
(58) Field of Classification Search ................. 370/231, 370/235, 352; 714/706
 See application file for complete search history.

(56) References Cited

U.S. PATENT DOCUMENTS

| 4,569,042 | A  | * | 2/1986  | Larson        | 370/250 |
| 5,065,394 | A  | * | 11/1991 | Zhang         | 370/411 |
| 6,411,622 | B1 | * | 6/2002  | Ohgane        | 370/395.1 |
| 6,438,187 | B1 | * | 8/2002  | Abbey         | 375/368 |
| 6,760,369 | B1 | * | 7/2004  | Chida         | 375/225 |
| 2002/0172202 | A1 | * | 11/2002 | Lee        | 370/389 |
| 2003/0202482 | A1 | * | 10/2003 | Dittmann et al. | 370/252 |

* cited by examiner

*Primary Examiner*—Ricky Q. Ngo
*Assistant Examiner*—Warner Wong

(57) ABSTRACT

System and method for determining expiration of a timestamp using a counter. Upon the occurrence of a first event, a time value derived from a binary counter with a length N is associated with the first event. At a later second time value derived from a binary counter with length N, the first time value is checked for expiration with respect to an expiration period. The second time value is summed with a predetermined offset value and the sum formatted as a number with length N+2. The first time value is subtracted from the sum and the two most significant bits are removed. The result is then compared to the expiration period to determine whether expiration has occurred.

12 Claims, 7 Drawing Sheets

500

505 — 10111 (23)

+

510 — 100000 (32)

=

515 — 0110111 (55)

-

520 — 11001 (25)

=

525 — 0011110 (30)

MASK

530 — x x 11110 (30)

COMPARE                TIMEOUT

SYSTEM AND METHOD FOR RESOLVING WRAPAROUND AMBIGUITY IN A COUNTER

BACKGROUND OF THE INVENTION

1. Field of the Invention

This invention relates to the timing of events in a context that involves an expiration period. In particular the invention relates to resolving wraparound of a counter used for timing and expiration.

2. Related Art

In the last few decades communications systems have been shifting from analog circuit-switched networks to digital packet-switched networks. In addition to the development of protocols for communication over infrastructure that was originally built for analog communications, new protocols are being developed in conjunction with infrastructure that is designed for digital communications.

For communication in a circuit switched network, a physical path is established in order to provide communication between two endpoints. The circuit is maintained for the duration of the communication session, and all information traverses the same circuit path.

In contrast, in a packet-switched network, the information being transmitted between two endpoints is encapsulated as one or more packets, each containing an address. The packet address enables the packet to find its destination when placed on a network having many possible paths and destinations.

A network is generally a collection of segments connected by devices that control the flow of packets between segments (e.g., routers and switches). Since a single block or stream of data may be broken up and transmitted as packets along different paths, there is a chance that some packets will experience delays.

Depending upon the nature of the data being sent and the protocol being used, a delay may result in a request for retransmission. For example, a destination application that fails to receive a packet containing part of a text document may request a retransmission of a packet that failed to arrive after a period of time. For real-time data streams such as video or voice, a delayed packet may become useless. In either case, a delayed packet loses its value to the application and it is desirable to remove it from the network. An example of a protocol that provide for packet timeout is Transmission Control Protocol (TCP).

Switches in a network may remove packets from the network by monitoring the delay associated with the transit of the packet through the switch. This is typically done by associating a timestamp with the packet upon its arrival so that its storage time in the switch can be calculated at the time it is ready to be transmitted. The storage time can then be compared to the allowable delay in the switch to determine whether the packet should be transmitted or discarded (timed out).

A general purpose method of timekeeping that is used in switches and other digital electronic devices and processing systems is to periodically increment a binary register or counter. A counter with a length N will be able to store $2^N$ unique values and will be able to measure a maximum interval of $2^N-1$. For example, a 5-bit counter starting at 00000 and incremented every $\frac{1}{16}$ of a second would reach 11111 at $1\frac{15}{16}$ second, and rollover or wraparound to 00000 at 2 seconds.

Wraparound or rollover is a source of ambiguity for any finite length counter. The length of a period of time that has passed between two observed values of a finite counter cannot be determined just by subtracting the first observed value from the second observed value, since wraparound may or may not have occurred between the two observations. If the result of subtracting the first value from the second value is a negative number, then further operations are required.

For example, following the above example of a 5-bit counter, a packet with a time stamp of 11000 ($\frac{24}{16}$ seconds) compared at a time of 11100 ($\frac{28}{16}$ seconds) and having an allowable expiration time of 1 second would be eligible for transmission if wraparound has not occurred (elapsed time=$\frac{4}{16}$ seconds), but may or may not be discarded if wraparound had occurred. Thus, unambiguous timeout calculations typically involve additional computational overhead for accounting of the wraparound of the counter.

Although the computation associated with timekeeping and wraparound accounting for a single packet may not be large in absolute terms, it can be a significant part of the overall effort in handling a packet, given that a router or switch handles millions of packets per second. This also applies to other types of devices that use a finite length counter to examine a timestamp to determine whether a timeout condition exists. Although prior art methods have addressed the problem of wraparound, the commonly used brute-force methods do incur significant overhead.

SUMMARY OF THE INVENTION

A system and method for resolving wraparound ambiguity in a counter is disclosed. In determining whether a period of time defined by a first time value derived from a counter and a second time value violates an expiration (timeout) value, the second time value is added to an offset produce a sum. Next, the second time value is subtracted from the sum to produce a difference. Leading bits of the difference are then masked, and the result compared to an expiration value. The invention provides for computationally efficient resolution of wraparound ambiguity and has the advantage of using only one compare operation.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 shows a quantitative example of the method embodiment of FIG. 1 with wraparound and a timeout.

DETAILED DESCRIPTION OF THE INVENTION

In the following detailed description of the present invention, a system and method for resolving wraparound ambiguity in a counter, numerous specific details are set forth in order to provide a thorough understanding of the present invention.

With the present invention, a timestamp value and a subsequent time value derived from a finite length counter subject to wraparound are used to determine expiration with respect to a predetermined expiration value. The present invention has the advantage of resolving wraparound ambiguity using a single compare operation.

In a method embodiment of the present invention, Upon the occurrence of a first event, a time value with a length N is associated with the first event. At a later second time value derived from a binary counter with length N, the first time value is checked for expiration with respect to an expiration period. The second time value is summed with a predetermined offset value and the sum formatted as a number with length N+2. The first time value is subtracted from the sum and the two most significant bits are removed. The result is then compared to the expiration period to determine whether expiration has occurred.

In a further embodiment of the present invention, two asynchronous counters are used. The first counter is used to provide a time stamp associated with an event, and the second counter is used to provide a second time value at which expiration is determined. The second time value is summed with a predetermined offset value equal to $2^N+1$ and the sum formatted as a number with length N+2. The first time value is subtracted from the sum and the two most significant bits are removed. The result is then compared to the expiration period to determine whether expiration has occurred.

Figure 1:
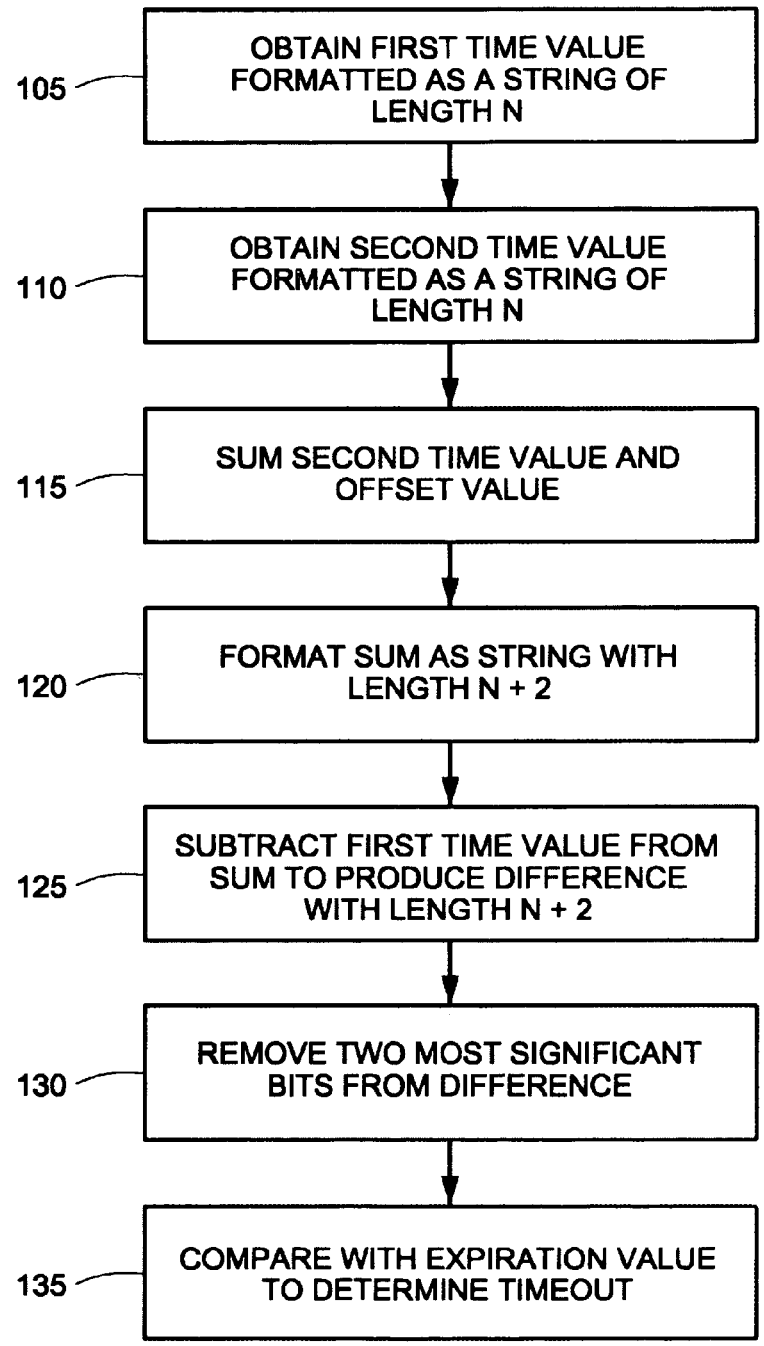
FIG. 1 shows a flow chart for a method embodiment in accordance with an embodiment of the present claimed invention.

FIG. 1 shows a flow chart 100 for a method embodiment the present invention. In step 105, a first time value is obtained and formatted as a string of length N (e.g., from a counter with a length of N bits). In the context of the present invention, "formatted as a string of length N" refers to the treatment of a string as having an intrinsic length N, regardless of whether or not it is stored in a register with a length greater than N or assigned to a variable with a length greater than length N, with padded bits.

In step 110, a second time value is obtained subsequent to the acquisition of the first time value. The second time value is obtained from a counter with length N and formatted as a string of length N. The second time value may or may not be obtained from the same counter as the first time value.

An example of a system in which the first and second time values are obtained is a network switch that obtains a first time value from an internal counter and assigns it to a packet upon arrival. Alternatively, the first time value may be derived from the packet header. The second time value is obtained from the internal counter at the time the switch is ready to transmit the packet.

In step 115, the second time value is summed with an offset value. For systems in which the first time value and second time value are derived from the same, or synchronous counters, the offset value is $2^N$, N being the length of the counter(s). For systems in which the first and second time values are obtained from asynchronous counters, the offset value is $2^N+1$.

In step 120, the sum of the offset value and the second time value is formatted as a string with length N+2. As with the first and second time values, formatting refers to the sum maintaining its intrinsic length of N+2 regardless of the length of the register it may be stored in or the length of a variable to which it may be assigned.

In step 125, the first time value is subtracted from the sum from step 120, and the difference is formatted as a string with length N+2. In step 130, the two most significant bits of the difference are removed (masked) to produce a string with length N. In step 135, the masked difference is compared with an expiration value to determine whether a timeout has occurred. For example, a switch may have an allowable latency of one second for packets passing through it. In this case, the expiration value would be the binary counter equivalent of one second, and a timeout would occur if the masked difference equaled or exceeded the expiration value.

Figure 2:
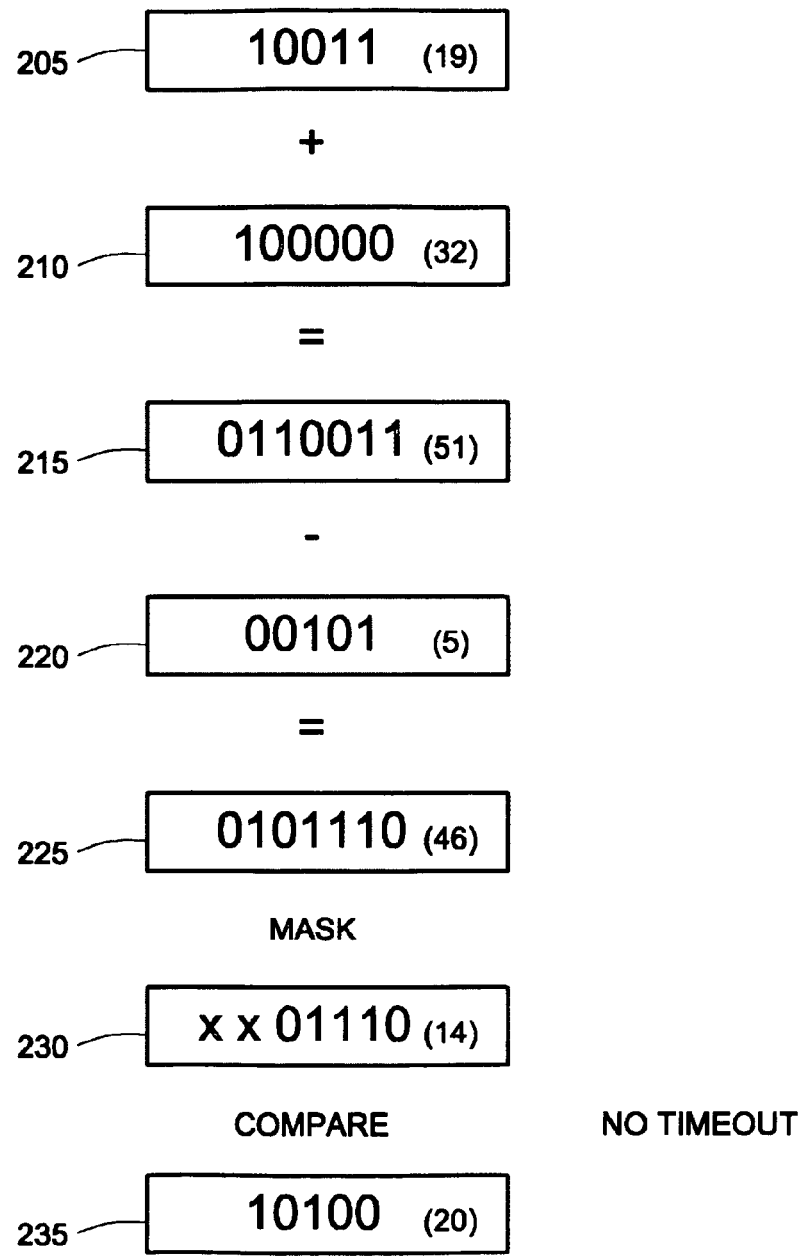
FIG. 2 shows a quantitative example of the method embodiment of FIG. 1 without wraparound and no timeout.

FIG. 2 shows a quantitative example of the method embodiment of FIG. 1 without wraparound and no timeout. The time values represented by binary strings are accompanied by their base 10 values in parentheses. In this example, the time values are obtained from a 5 bit counter, but other values may be used in the practice of the invention.

A second time value 205 is summed with an offset value 210 to produce a sum 215 that is formatted as a 7 bit string. The offset value used in this example selected as $2^5$, as would be the case for a synchronous system.

A first time value 220 is subtracted from the sum 215 to produce a difference 225, that is masked by removing the two most significant bits to produce a masked difference 230. The masked difference 230 is compared to an expiration value 235. In the example of FIG. 2, the masked difference 230 is less than the expiration value 235 and there is not a timeout.

Figure 3:
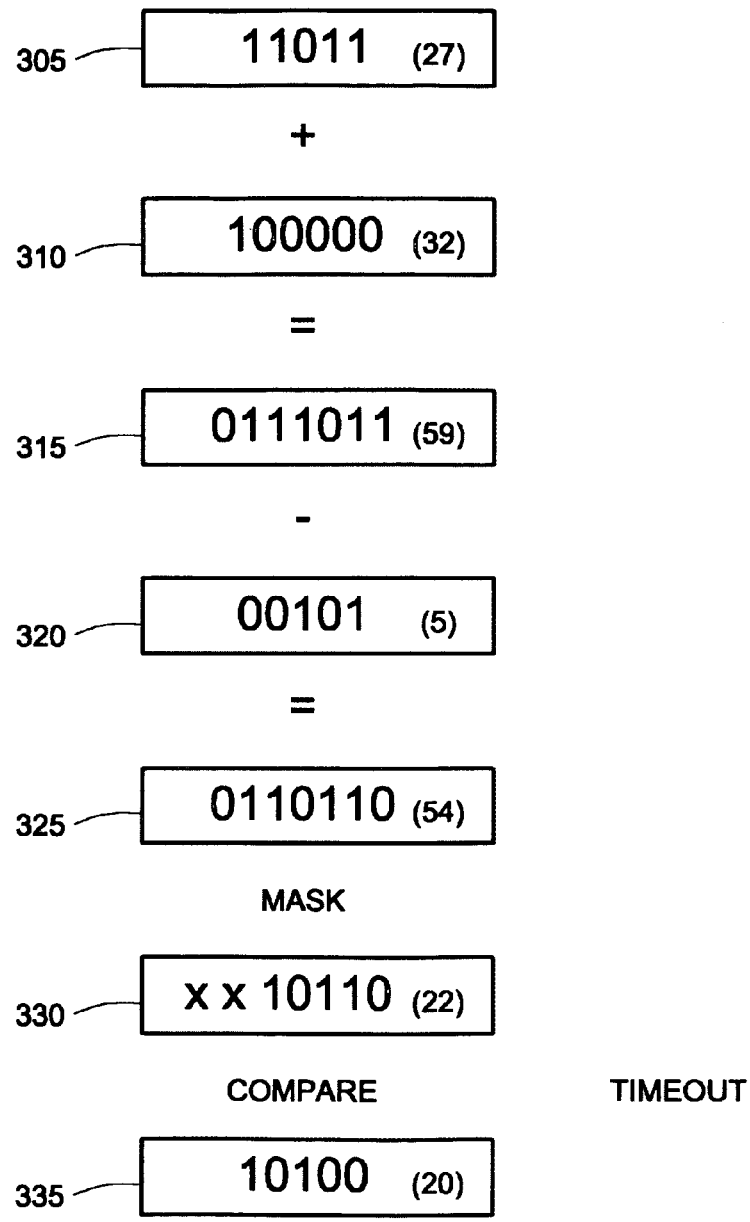
FIG. 3 shows a quantitative example of the method embodiment of FIG. 1 without wraparound and a timeout.

FIG. 3 shows a quantitative example of the method embodiment of FIG. 1 without wraparound and a timeout. This example is similar to that shown in FIG. 2, except for a different value for the second time value.

A second time value 305 is summed with an offset value 310 to produce a sum 315 that is formatted as a 7 bit string. The offset value used in this example selected as $2^5$, as would be the case for a synchronous system.

A first time value 320 is subtracted from the sum 315 to produce a difference 325, that is masked by removing the two most significant bits to produce a masked difference 330. The masked difference 330 is compared to an expiration value 335. In the example of FIG. 3, the masked difference 330 is greater than the expiration value 335 and a timeout exists.

Figure 4:
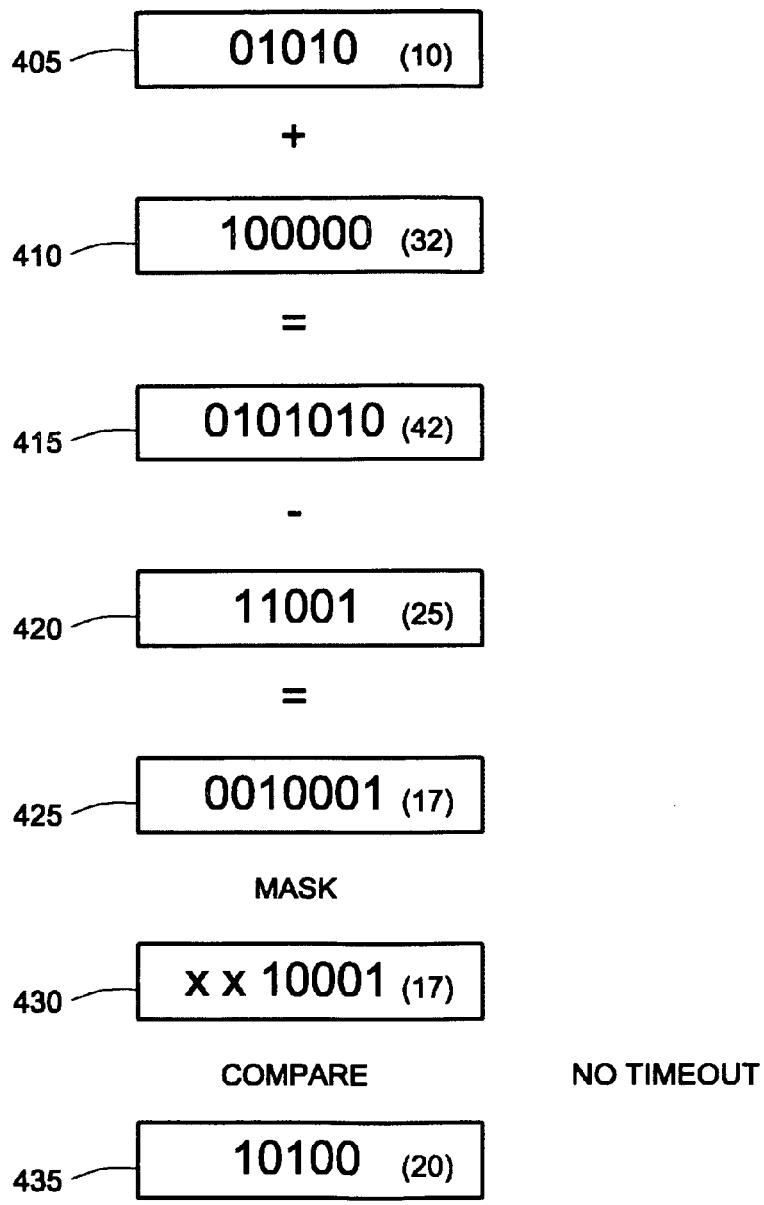
FIG. 4 shows a quantitative example of the method embodiment of FIG. 1 with wraparound and no timeout.

FIG. 4 shows a quantitative example of the method embodiment of FIG. 1 with wraparound and no timeout. In this example, the second time value 420 (e.g., a packet timestamp) is close to the counter's upper limit of 32.

A second time value 405 is summed with an offset value 410 to produce a sum 415 that is formatted as a 7 bit string. The offset value used in this example selected as $2^5$, as would be the case for a synchronous system.

A first time value 420 is subtracted from the sum 415 to produce a difference 425, that is masked by removing the two most significant bits to produce a masked difference 430. The masked difference 430 is compared to an expiration value 435. In the example of FIG. 4, the masked difference 430 is less than the expiration value 435 and there is not a timeout.

FIG. 5 shows a quantitative example of the method embodiment of FIG. 1 with wraparound and a timeout. A second time value 505 is summed with an offset value 510 to produce a sum 515 that is formatted as a 7 bit string. The offset value used in this example selected as $2^5$, as would be the case for a synchronous system.

A first time value 520 is subtracted from the sum 515 to produce a difference 525, that is masked by removing the two most significant bits to produce a masked difference 530. The masked difference 530 is compared to an expiration value 535. In the example of FIG. 5, the masked difference 530 is greater than the expiration value 535 and a timeout exists.

Figure 6:
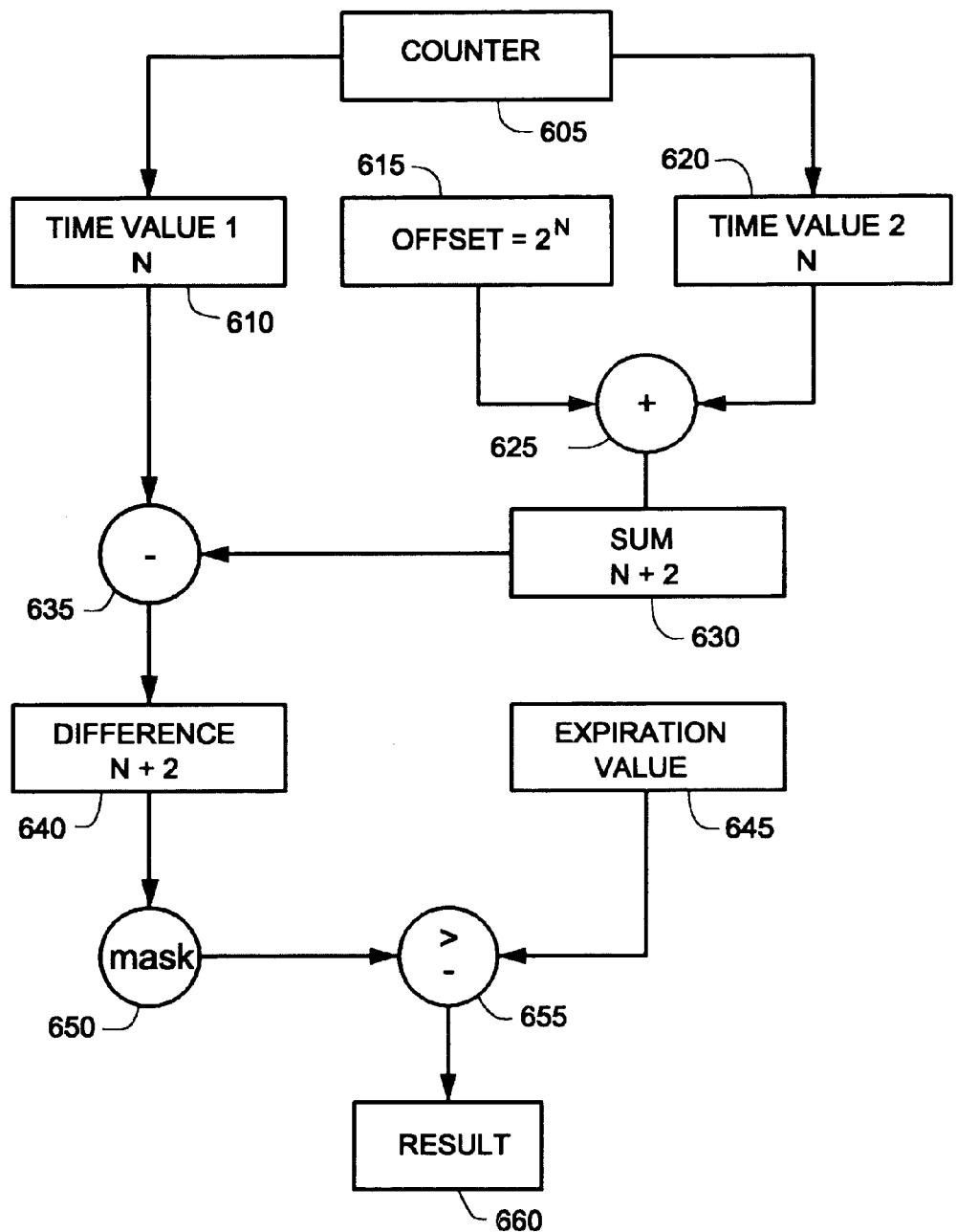
FIG. 6 shows a schematic of a single clock system embodiment in accordance with an embodiment of the present claimed invention.

FIG. 6 shows a schematic of a single counter system embodiment of the present invention. Various combinations of logic circuits, storage elements, and instructions may be used to implement the schematic, for example, registers with a width greater than N or N+2 may be combined with logic for bit shifting operations to produce masking effects. Also, accumulators may be used to reduce the total number of registers used. In hardware, a programmable logic device (PLD) or application specific integrated circuit (ASIC) may be used.

A counter 605 with width N provides a first time value that is stored in a register 610 and a second time value that is stored in a register 620. An example of a first time value is a packet timestamp and an example of a second time value is the time at which a network switch associated with the counter is ready to transmit the packet.

Registers 610 and 620 have a width of at least N and register 615 has a width of at least N+1. The registers 610 and 620 may part of an application specific circuit and have the same width as the counter, or they may be general purpose registers in a microprocessor or microcontroller having an arithmetic logic unit (ALU).

An adder 625 sums an offset value $2^N$ stored in register 615 and the second time value stored in register 620. The second time value stored in register 620 may be obtained from the counter 605 as shown, or may be obtained from another source such as a packet header. The sum produced is stored in register 630, which has a width of at least N+2. The contents of register 610 are subtracted from the contents of register 630 by an adder 635 configured for subtraction and the result is stored in register 640 with a width of at least N+2. A mask 650 is applied to the contents of register 640 to remove the two most significant bits, and the masked string is compared with an expiration value stored in register 645 by logic 655 to give a timeout determination result 660. This value may be a flag bit set for inspection by other processes in the system.

Figure 7:
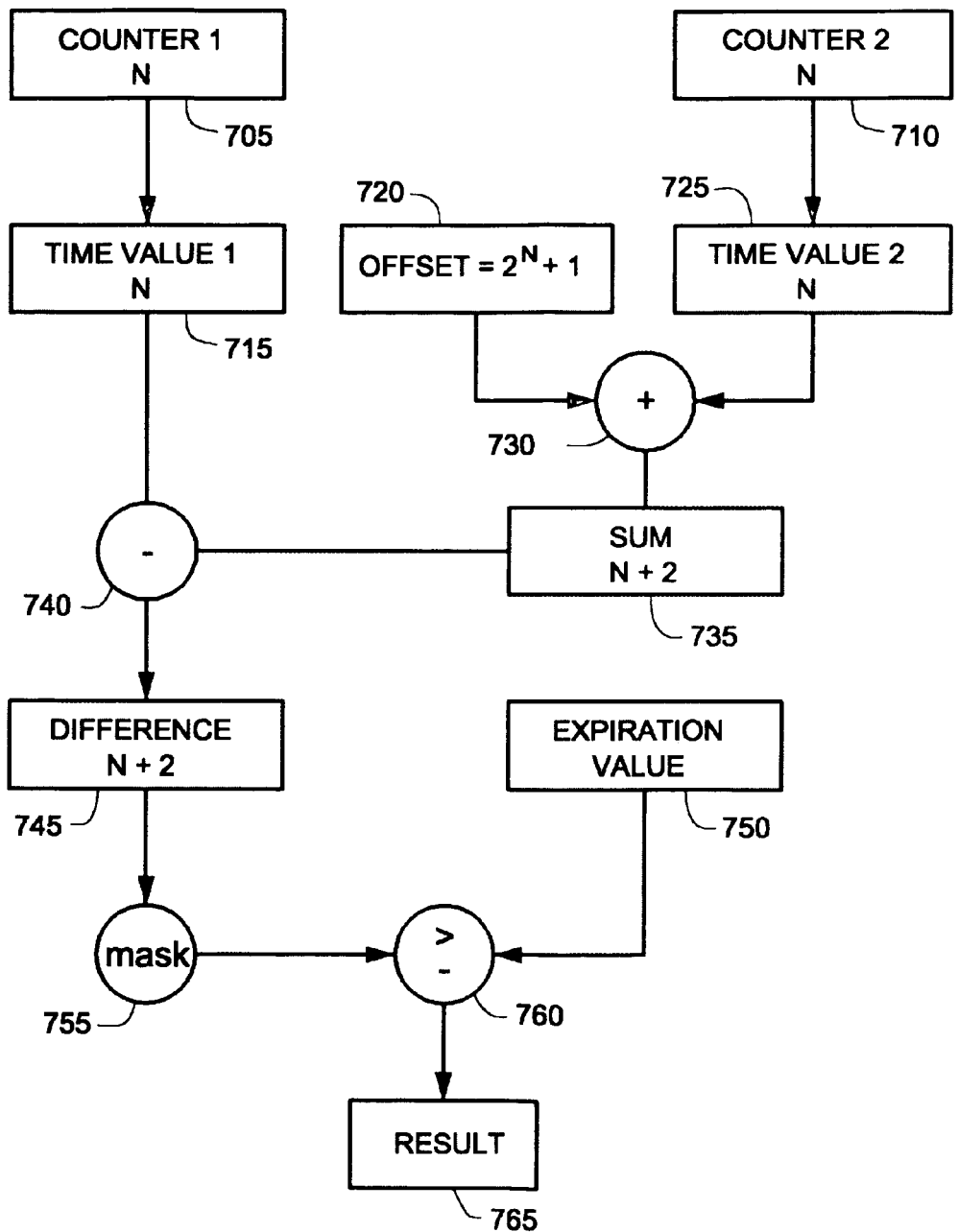
FIG. 7 shows a multiple clock asynchronous system embodiment in accordance with an embodiment of the present claimed invention.

FIG. 7 shows a multiple clock asynchronous system embodiment in accordance with an embodiment of the present claimed invention. Various combinations of logic circuits, storage elements, and instructions may be used to implement the schematic.

The schematic of FIG. 7 is similar to that of FIG. 6, however, there is are two important differences. First, the time value stored in register 715 is obtained from a first counter 705 that may be asynchronous with respect to a second counter 710. Second, the Offset stored in register 720 is equal to $2^N+1$.

For a system with two asynchronous counters wherein the second counter may lag the first counter by a fraction of a count it may be possible for the system to stored a value in register 725 that is less than the value in register 715 if the elapsed time is very short. For example, an idle switch having two counters might receive a packet and timestamp it with a first counter and forward the packet for transmission before the second counter has caught up with the first counter.

The general form of the offset stored in register 720 is $2^N+m$. For a synchronous system, m=0. In order to avoid a false timeout condition due to fractional lag in an asynchronous system, m=1. For systems in which the difference between counters is more than a fraction of a count, m>1.

The lack of synchronization may be the result of small differences between counters that accumulate between periodic updates. For example, in a network that depends upon the Global Positioning System to periodically set time for the network, counters may develop differences between system time updates.

While the present invention has been described in particular embodiments, it should be appreciated that the present invention should not be construed as limited by such embodiments, but rather construed according to the below claims.

The invention claimed is:

1. A method for resolving timeout condition ambiguity in a counter subject to wraparound, comprising:
   obtaining a first time value associated with a first event;
   obtaining a second time value associated with a second event;
   adding said second time value and an offset to produce a sum;
   subtracting said first time value from said sum to produce a difference;
   masking leading bits of said difference to produce a masked difference; and
   performing a single compare operation between said masked difference and an expiration value, resolving said timeout condition ambiguity associated with said based on said compare operation.

2. The method of claim 1, further comprising; associating said first time value with a data packet.

3. The method of claim 2, further comprising transmitting said data packet when a timeout does not exist.

4. The method of claim 1, further comprising masking two bits of said difference.

5. The method of claim 1, further comprising using an arithmetic logic unit (ALU) of a microprocessor to perform said compare operation and said masking.

6. The method of claim 1, further including obtaining said first time value and said second time value from a single counter.

7. The method of claim 1 further including obtaining said first time value from a first counter and obtaining said second time value from a second counter.

8. The method of claim 1, further including adding 1 to said sum.

9. A computer readable medium containing executable instructions which, when executed in a processing system, causes the system to perform the steps resolving timeout condition ambiguity in a counter subject to wraparound, comprising:
   obtaining a first time value associated with a first event;
   obtaining a second time value associated with a second event;
   adding said second time value and an offset to produce a sum;
   subtracting said first time value from said sum to produce a difference;
   masking leading bits of said difference to produce a masked difference; and
   performing a single compare operation between said masked difference and an expiration value, resolving said timeout condition ambiguity associated with said counter based on said compare operation.

10. The computer readable medium of claim 9, further comprising instructions for reading a timestamp from a packet header.

11. The computer readable medium of claim 9, further comprising instructions for loading said first time value from a first counter.

12. The computer readable medium of claim 9, further comprising instructions for loading said second time value from a second counter.

* * * * *